US012252172B2

(12) United States Patent
Joseph et al.

(10) Patent No.: US 12,252,172 B2
(45) Date of Patent: Mar. 18, 2025

(54) VEHICULAR INTELLIGENT REMOTE PARKING ASSIST SYSTEM

(71) Applicant: Magna Electronics Inc., Auburn Hills, MI (US)

(72) Inventors: Harold E. Joseph, Brampton (CA); Truman S. Shen, Farmington Hills, MI (US); Jyothi P. Gali, Rochester Hills, MI (US); Alexander Velichko, Toronto (CA); Kevin A. Powell, Brampton (CA)

(73) Assignee: Magna Electronics Inc., Auburn Hills, MI (US)

( * ) Notice: Subject to any disclaimer, the term of this patent is extended or adjusted under 35 U.S.C. 154(b) by 364 days.

(21) Appl. No.: 17/933,860

(22) Filed: Sep. 21, 2022

(65) Prior Publication Data

US 2023/0093053 A1 Mar. 23, 2023

Related U.S. Application Data

(60) Provisional application No. 63/262,055, filed on Oct. 4, 2021, provisional application No. 63/261,435, filed on Sep. 21, 2021.

(51) Int. Cl.
| | |
|---|---|
| *B60W 30/06* | (2006.01) |
| *B62D 15/02* | (2006.01) |
| *G06V 20/58* | (2022.01) |
| *H04W 4/40* | (2018.01) |

(52) U.S. Cl.
CPC ......... *B62D 15/0285* (2013.01); *B60W 30/06* (2013.01); *G06V 20/586* (2022.01); *H04W 4/40* (2018.02); *B60W 2420/403* (2013.01); *B60W 2556/45* (2020.02)

(58) Field of Classification Search
CPC .............. B62D 15/0285; B60W 30/06; B60W 2420/403; B60W 2556/45; G06V 20/586; H04W 4/40
See application file for complete search history.

(56) References Cited

U.S. PATENT DOCUMENTS

| | | | | |
|---|---|---|---|---|
| 3,568,161 | A | * 3/1971 | Knickel | .................. G08G 1/20 340/992 |
| 5,537,003 | A | * 7/1996 | Bechtel | ................ B60Q 1/1423 315/159 |
| 5,550,677 | A | 8/1996 | Schofield et al. | |
| 5,670,935 | A | 9/1997 | Schofield et al. | |

(Continued)

*Primary Examiner* — Nay Tun
(74) *Attorney, Agent, or Firm* — HONIGMAN LLP

(57) ABSTRACT

A vehicular parking assistance system includes a camera disposed at a vehicle and capturing image data. An electronic control unit (ECU) includes an image processor for processing image data captured by the camera. The parking assistance system, responsive to an input, determines a direction of travel for an automated parking maneuver. The parking assistance system, responsive to processing by the image processor of image data captured by the camera, determines a boundary of a free space in the direction of travel for the automated parking maneuver. The free space at least partially bounds an area where the vehicle can maneuver without colliding with a detected object. The parking assistance system, while driving the vehicle in the direction of travel, laterally adjusts a path of the vehicle based on the determined boundary of free space to avoid the detected object.

22 Claims, 8 Drawing Sheets

(56) References Cited

U.S. PATENT DOCUMENTS

| | | |
|---|---|---|
| 5,949,331 A | 9/1999 | Schofield et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,038,577 B2 | 5/2006 | Pawlicki et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,295,227 B1 | 11/2007 | Asahi et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 7,720,580 B2 | 5/2010 | Higgins-Luthman |
| 7,855,755 B2 | 12/2010 | Weller et al. |
| 8,013,780 B2 | 9/2011 | Lynam |
| 8,027,029 B2 | 9/2011 | Lu et al. |
| 8,874,317 B2 | 10/2014 | Marczok et al. |
| 9,036,026 B2 | 5/2015 | Dellantoni et al. |
| 9,140,553 B2 * | 9/2015 | Grimm ............. B60W 50/0098 |
| 9,146,898 B2 | 9/2015 | Ihlenburg et al. |
| 9,361,803 B2 * | 6/2016 | Lee ................... B62D 15/0285 |
| 10,071,687 B2 | 9/2018 | Ihlenburg et al. |
| 10,078,789 B2 | 9/2018 | Gupta et al. |
| 10,086,870 B2 | 10/2018 | Gieseke et al. |
| 10,099,614 B2 | 10/2018 | Diessner |
| 10,156,848 B1 | 12/2018 | Konrardy et al. |
| 10,160,437 B2 | 12/2018 | Rinaldo |
| 10,214,206 B2 | 2/2019 | Latotzki |
| 10,328,932 B2 | 6/2019 | Gieseke et al. |
| 10,583,779 B2 | 3/2020 | Koravadi |
| 11,560,143 B2 | 1/2023 | Solar |
| 11,938,925 B2 * | 3/2024 | Hara ................. B60W 60/0015 |
| 2002/0198634 A1 | 12/2002 | Shimazaki et al. |
| 2008/0077294 A1 | 3/2008 | Danz et al. |
| 2008/0211651 A1 | 9/2008 | Beutnagel-Buchner et al. |
| 2009/0157260 A1 | 6/2009 | Lee |
| 2010/0039292 A1 | 2/2010 | Scherl et al. |
| 2012/0062743 A1 | 3/2012 | Lynam et al. |
| 2012/0218412 A1 | 8/2012 | Dellantoni et al. |
| 2013/0085637 A1 * | 4/2013 | Grimm ............. B62D 15/0285 701/25 |
| 2013/0103246 A1 | 4/2013 | Staack |
| 2013/0222592 A1 | 8/2013 | Gieseke |
| 2013/0231824 A1 | 9/2013 | Wilson et al. |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0149022 A1 | 5/2015 | Harvey |
| 2015/0158499 A1 | 6/2015 | Koravadi |
| 2015/0239357 A1 * | 8/2015 | Huntzicker ............. B60L 53/68 701/22 |
| 2015/0251599 A1 | 9/2015 | Koravadi |
| 2015/0344028 A1 | 12/2015 | Gieseke et al. |
| 2015/0352953 A1 | 12/2015 | Koravadi |
| 2015/0370255 A1 | 12/2015 | Harvey |
| 2016/0036917 A1 | 2/2016 | Koravadi et al. |
| 2016/0115702 A1 | 4/2016 | Nordbruch et al. |
| 2016/0125736 A1 | 5/2016 | Shaik |
| 2016/0189435 A1 | 6/2016 | Beaurepaire |
| 2016/0210853 A1 | 7/2016 | Koravadi |
| 2016/0231133 A1 | 8/2016 | Johnson et al. |
| 2016/0240080 A1 | 8/2016 | Nordbruch |
| 2017/0015312 A1 | 1/2017 | Latotzki |
| 2017/0017848 A1 | 1/2017 | Gupta et al. |
| 2017/0050672 A1 | 2/2017 | Gieseke et al. |
| 2017/0075352 A1 | 3/2017 | Nordbruch |
| 2017/0153714 A1 | 6/2017 | Gao et al. |
| 2017/0232891 A1 | 8/2017 | Nordbruch |
| 2017/0253237 A1 | 9/2017 | Diessner |
| 2017/0254654 A1 | 9/2017 | Nordbruch |
| 2017/0297625 A1 | 10/2017 | Irion et al. |
| 2017/0305466 A1 | 10/2017 | Nordbruch |
| 2017/0305467 A1 | 10/2017 | Nordbruch |
| 2017/0308095 A1 | 10/2017 | Irion et al. |
| 2017/0309183 A1 | 10/2017 | Nordbruch et al. |
| 2017/0313306 A1 | 11/2017 | Nordbruch |
| 2017/0313307 A1 | 11/2017 | Nordbruch |
| 2017/0317748 A1 | 11/2017 | Krapf |
| 2017/0323565 A1 | 11/2017 | Nordbruch et al. |
| 2017/0327125 A1 | 11/2017 | Nordbruch |
| 2017/0329341 A1 | 11/2017 | Rakshit et al. |
| 2017/0329346 A1 | 11/2017 | Latotzki |
| 2017/0365170 A1 | 12/2017 | Lazic et al. |
| 2018/0004218 A1 | 1/2018 | Mielenz et al. |
| 2018/0024548 A1 | 1/2018 | Mielenz et al. |
| 2018/0039844 A1 | 2/2018 | Nordbruch |
| 2018/0046198 A1 | 2/2018 | Nordbruch et al. |
| 2018/0093664 A1 * | 4/2018 | Kim .................... B60W 40/10 |
| 2018/0105208 A1 * | 4/2018 | Kim .................... G05D 1/0061 |
| 2018/0171655 A1 | 6/2018 | Scherer et al. |
| 2018/0194343 A1 | 7/2018 | Lorenz |
| 2018/0286249 A1 | 10/2018 | Nordbruch |
| 2018/0357906 A1 | 12/2018 | Yaldo et al. |
| 2018/0361870 A1 * | 12/2018 | Zhao ..................... B60L 53/68 |
| 2019/0016331 A1 * | 1/2019 | Carlson ................ G05D 1/0088 |
| 2019/0286121 A1 * | 9/2019 | Bando ..................... B62D 1/00 |
| 2020/0094816 A1 * | 3/2020 | Krekel ................ G05D 1/0088 |
| 2020/0130676 A1 | 4/2020 | Smid |
| 2020/0142400 A1 * | 5/2020 | Kuwabara ............... B60R 21/00 |
| 2020/0192362 A1 * | 6/2020 | Murad ................. G06V 20/586 |
| 2020/0207333 A1 * | 7/2020 | Miller ................. G01C 21/3602 |
| 2020/0282974 A1 * | 9/2020 | Diessner ................ B60W 10/18 |
| 2021/0042540 A1 * | 2/2021 | Shih .................... B62D 15/0285 |
| 2021/0086755 A1 * | 3/2021 | Moshchuk ............. B60L 15/20 |
| 2021/0107467 A1 * | 4/2021 | Hiei ...................... B60W 30/06 |
| 2024/0034306 A1 * | 2/2024 | Ishibashi ............. G06V 20/586 |

* cited by examiner

VEHICULAR INTELLIGENT REMOTE PARKING ASSIST SYSTEM

CROSS REFERENCE TO RELATED APPLICATIONS

The present application claims the filing benefits of U.S. provisional application Ser. No. 63/262,055, filed Oct. 4, 2021, and U.S. provisional application Ser. No. 63/261,435, filed Sep. 21, 2021, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular parking assistance system includes a camera disposed at a vehicle equipped with the vehicular parking assistance system and viewing exterior of the vehicle. The camera captures image data. The camera includes a CMOS imaging array and the CMOS imaging array may include at least one million photosensors arranged in rows and columns. The system includes an electronic control unit (ECU) with electronic circuitry and associated software. The electronic circuitry of the ECU includes an image processor for processing image data captured by the camera. The vehicular parking assistance system, responsive to an input wirelessly communicated to the vehicular parking assistance system from exterior of the vehicle, determines a direction of travel for an automated parking maneuver to maneuver the vehicle toward and into a target parking space. The vehicular parking assistance system, via processing at the ECU of image data captured by the camera, is operable to detect one or more objects viewed by the camera. The vehicular parking assistance system, via processing at the ECU of image data captured by the camera, and responsive to detecting an object viewed by the camera, determines a boundary of a free space in the direction of travel for the automated parking maneuver. The boundary of the free space at least partially bounds an area where the vehicle can maneuver without colliding with the detected object. The vehicular parking assistance system, while maneuvering the vehicle in the direction of travel toward and into the target parking space, adjusts steering of the vehicle based on the determined boundary of free space in the direction of travel for the automated parking maneuver to avoid the detected object.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or parking assistance system operates to capture images exterior of the vehicle and may process the captured image data to display images and to detect objects at or near the vehicle and in the predicted path of the vehicle, such as to assist a driver of the vehicle in maneuvering the vehicle in a forward or rearward direction. The parking assistance system includes an image processor or image processing system that is operable to receive image data from one or more cameras. Optionally, the vision system may provide display, such as a rearview display or a top down or bird's eye or surround view display or the like.

Figure 1:
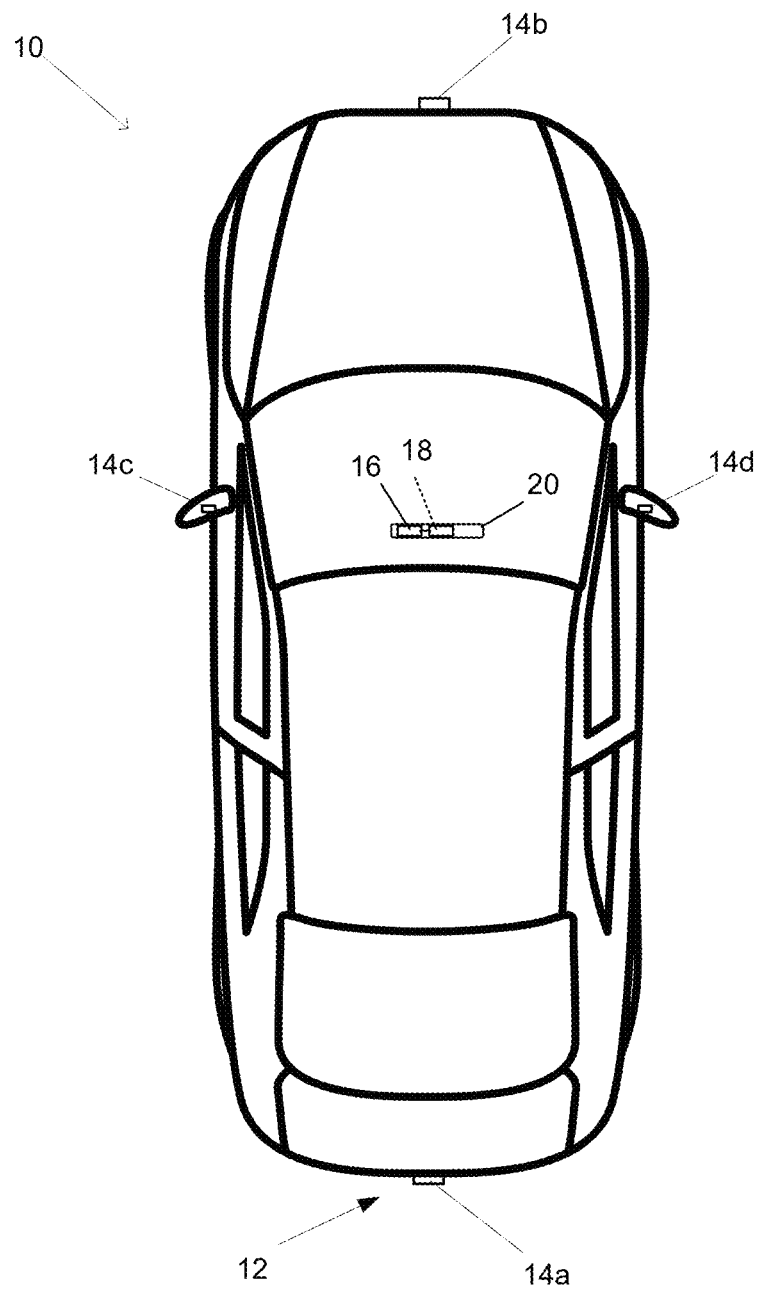
FIG. 1 is a plan view of a vehicle with a driver assistance system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Many vehicles include a parking assist system to assist the driver in parking the vehicle, especially when parking in tight spots. Some of these systems require the user to be outside of the vehicle and then use a mobile phone app or key fob to activate the feature to maneuver and/or control the vehicle. For example, the user may interact with a user device such as a mobile phone to command/control the vehicle to move slowly forward or backward to maneuver into a tight parking space (e.g., where the driver does not have room to open a door of the vehicle after pulling in without the door colliding with an object).

Implementations herein include a parking assist system that can detect the environment around the vehicle and can automatically align the vehicle based on the availability of free space. The system may correctly estimate a location of one or more objects in the path/trajectory of the vehicle, such as (i) parking lines, (ii) vehicles and other object boundaries, (iii) garage doors, and/or (iv) pillars and other objects or structures. The system determines and analyzes the positions of the objects or structures, and based on this analysis, estimates a free space around and in front of the vehicle (i.e., the space the vehicle can maneuver without colliding with an obstacle). The system, based on the determined available free space, automatically/autonomously (i.e., without the user or driver directly controlling steering of the vehicle) or semi-autonomously aligns the vehicle during the parking maneuver. The system may use various sensors mounted on and around the vehicle to estimate the free space and to help position the vehicle in the correct space or location.

Figure 2:
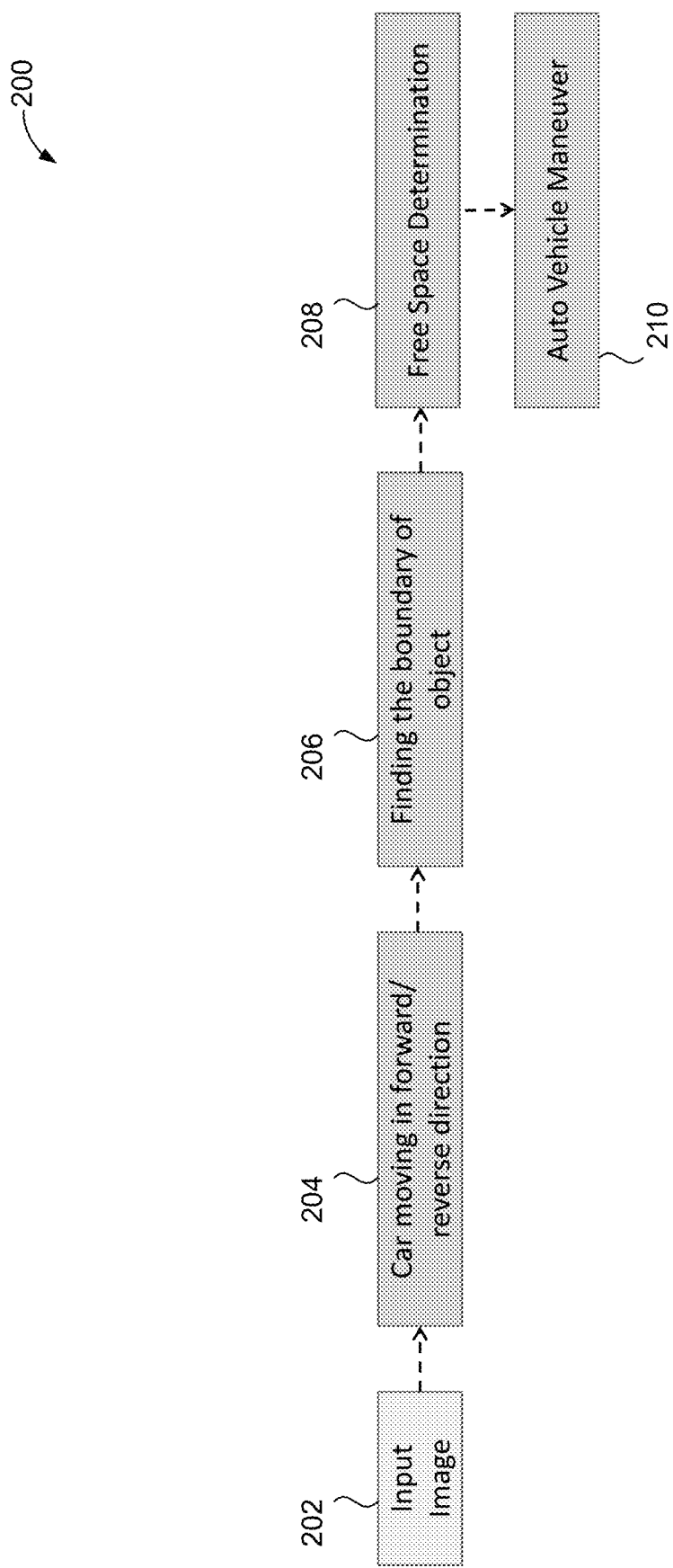
FIG. 2 is a block of the driver assistance system of FIG. 1.

Referring now to FIG. 2, a block diagram 200 of the parking assist system includes an input image block where the system captures one or more frames of image data (e.g., via one or more cameras disposed at the vehicle). The system may additionally or alternatively receive sensor data from other sensors, such as ultrasonic sensors, radar sensors, lidar, etc. At block 204, the system determines whether the vehicle is to move or is moving in a forward direction or a reverse direction. For example, the user may provide an input indicating the direction the vehicle is to move via a mobile device such as a mobile phone or key fob. For example, the user provides a user input indicating the vehicle should move forward or a different user input indicating the vehicle should move backward. In other examples, the user may provide the user input (e.g., to engage the system and indicate a direction) via a display or other control within the vehicle and then exit the vehicle prior to the system moving the vehicle. In yet other examples, the system may automatically determine the direction (e.g., by detecting a location of a parking space via parking lines or markers in front of or behind the vehicle).

Figure 3:
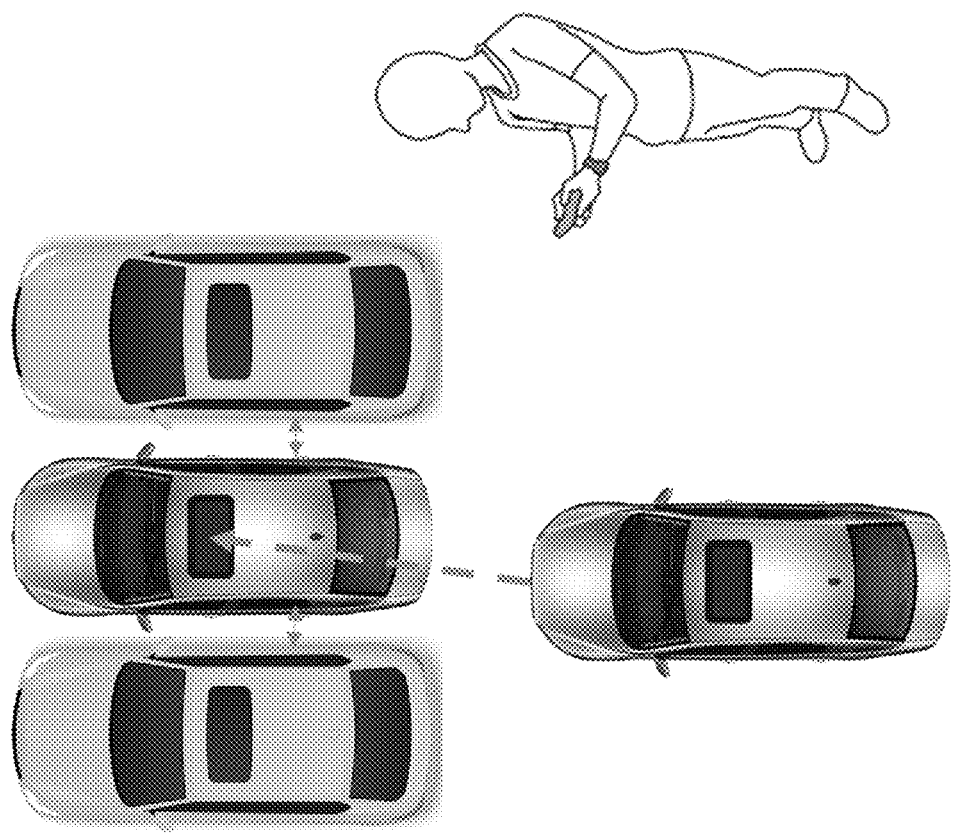
FIGS. 3 and 4 illustrate exemplary applications of the driver assistance of FIG. 1.
Figure 4:
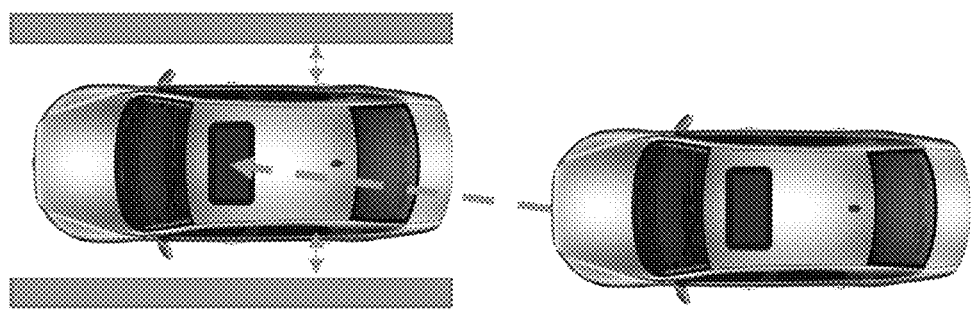
Figure 4:
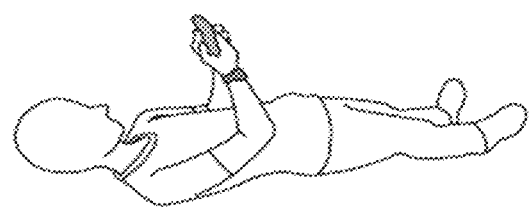

At block 206, the system determines boundaries of each object within a threshold distance of the vehicle in the direction the vehicle is moving. For example, when the vehicle is going to move forward or is moving forward, the system may determine the boundaries of objects within at least 5 meters, within at least 10 meters, or within at least 20 meters generally forward of the vehicle. In other examples, the system determines the boundaries of objects within a threshold distance of the vehicle in any direction, regardless of the direction the vehicle is traveling or will travel. Based on the determined boundaries, the system, at block 208, determines a free space around the vehicle. The free space defines an area around the vehicle that the vehicle can maneuver within without colliding with an obstacle. The system may only determine the free space in a direction of travel indicated by the user (e.g., forward or rearward of the vehicle). Based on the free space determination, the system, at block 210, automatically maneuvers the vehicle by aligning the vehicle with the free space and moving in the indicated direction (e.g., forward or rearward). The system may provide steering to laterally move the vehicle around vehicles or other objects based on the free space determination so that the vehicle is optimally aligned with determined the free space. For example, the user may send a command to the vehicle to move forward. The system may automatically determine, based on the free space determination, that a lateral movement is necessary to continue moving forward. That is, the vehicle moves laterally without receiving a lateral movement command from the user. For example, as shown in FIGS. 3 and 4, the system assists the driver with pulling into tight parking spaces with or without parking lines (FIG. 3) and/or parking in garages where the sides do not allow the door of the vehicle to be opened (FIG. 4). In both examples, the vehicle must move laterally to complete the parking maneuver.

Referring now to FIGS. 5-8, in some examples, the parking assistance system, upon receiving a user command, autonomously parks the vehicle (i.e., without the driver/user being inside the vehicle) in the first available parking slot along an aisle of a parking lot. The system does not require the user to be present in the vehicle and may accept park, summons, activation, pause, and/or deactivation commands from a user device (e.g., a mobile phone) over wireless communication channels (e.g., cellular communications, WIFI, BLUETOOTH, etc.). During parking, the system is responsible for complete vehicle control including emergency braking while operating remotely.

Optionally, the system supports a summons feature using the location of a key fob or a smart phone or other user device. For example, the user indicates a summons command via a user input on the user device and the vehicle autonomously navigates to the location of the user device (e.g., using GPS signals).

Figure 5:
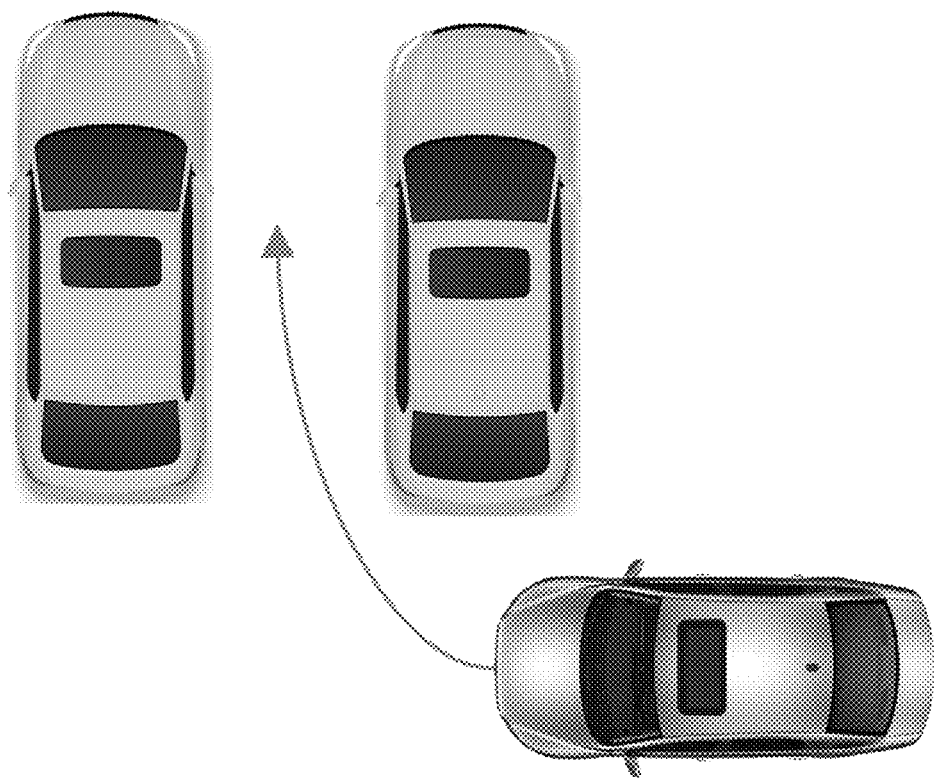
FIGS. 5-7 illustrate a vehicle maneuvering into different parking spaces.
Figure 6:
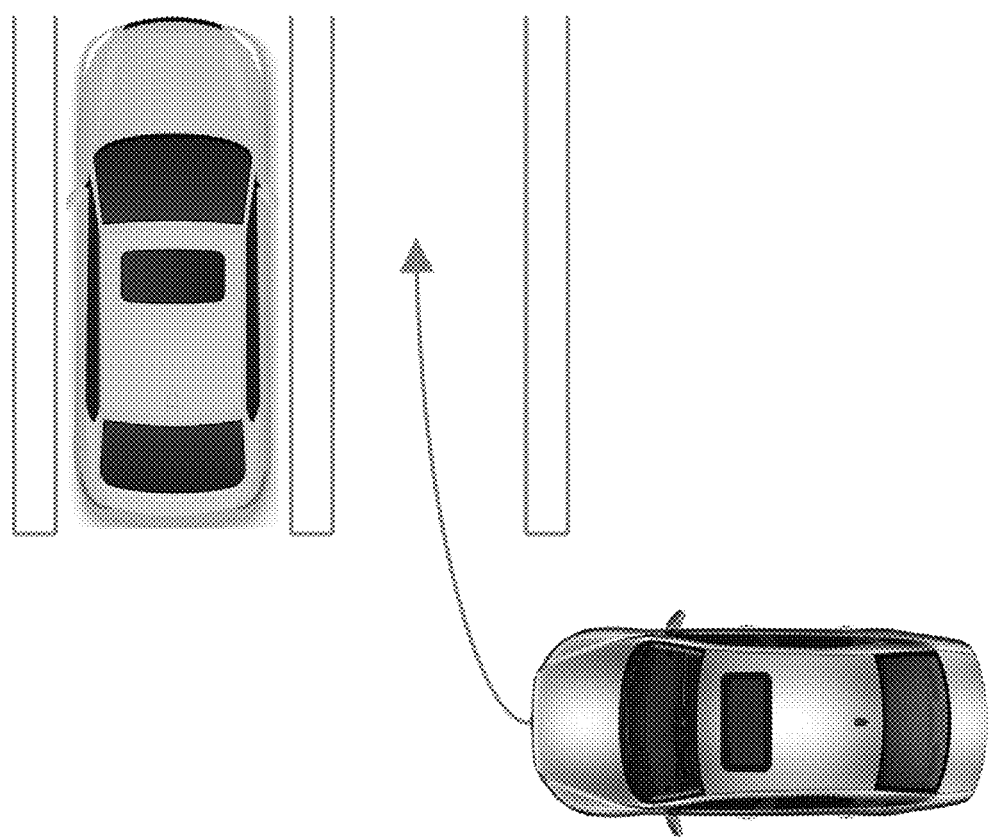
Figure 7:
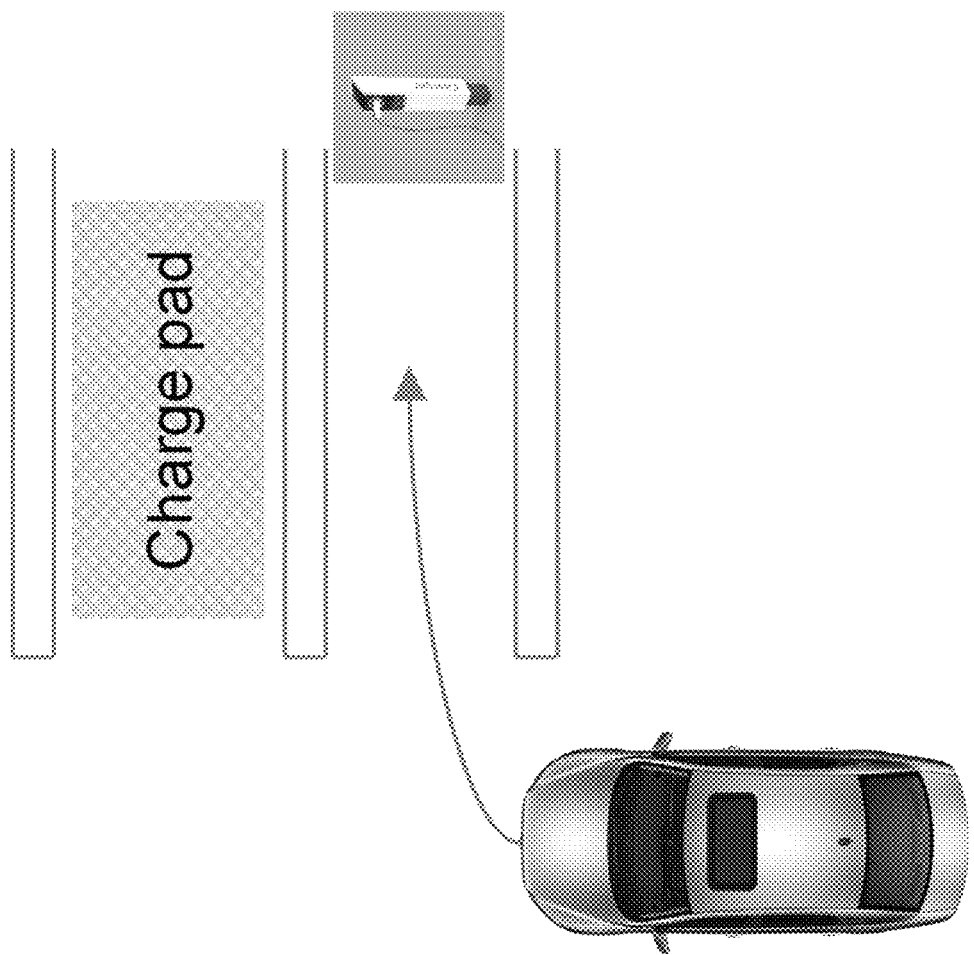

The system may support both parking and summon features. The system may detect the environment around the equipped vehicle using sensors such as, but not limited to, surround view cameras, radar sensors, and ultrasonic sensors. The user of the equipped vehicle may activate the park assist of the system after exiting the vehicle with the vehicle being aligned with a parking aisle/row (e.g., of a parking lot) using the key fob or an application executing on a user device (FIGS. 5-7).

The system may estimate a free space available to maneuver along the parking aisle/row. Once the vehicle begins moving autonomously in response to the command from the user, the system may begin scanning for the empty parking slots/spaces along the parking aisle. The system may support a variety of different parking spaces, such as line only parking slots (i.e., empty slots with no cars) (FIG. 5), vehicle based parking slots (FIG. 6), and electronic vehicle charging stations/pads (FIG. 7).

Upon determining/identifying the first empty parking slot along the parking aisle, the system may stop the vehicle before the parking space and plan a trajectory to accurately align the equipped vehicle in the parking space/slot/stall. The system may determine the first empty parking space by processing sensor data such as image data captured by a camera. The first available slot may be defined as the nearest parking slot the vehicle can safely park in along the current parking aisle where the equipped vehicle is located. Optionally, upon detecting the first available parking location, the vehicle stops at a parkable location, which is a point at which the system stops the vehicle and plans the path or trajectory to park the vehicle in the first empty slot to complete the parking maneuver. The system may then follow the generated path to complete the parking maneuver.

After completing a parking maneuver, the system may transmit a notification to the user via a wireless communication network (e.g., a cellular wireless network, WIFI, BLUETOOTH, etc.). For example, the vehicle sends the user a text message or a notification via an application executing on a user device that includes a status of the vehicle, a status of the parking maneuver, a location of the vehicle, etc.

While in an active state (with the vehicle stationary or in motion), the system may accurately estimate a location of any number of objects (e.g., while following in the parking path/trajectory of the vehicle). For example, the system may track parking lines, induction charge pads, charge locations, other vehicles and object boundaries, pedestrians, shopping carts, baby strollers, pillars, curbs, and other objects.

Optionally, the system may include a pause functionality. The system may stop or pause (e.g., for comfort or emergency braking) the vehicle when an obstacle enters the path/trajectory of the equipped vehicle or in response to a user command. The system may resume the maneuver when the obstacle clears the path or in response to a user command.

Figure 8:
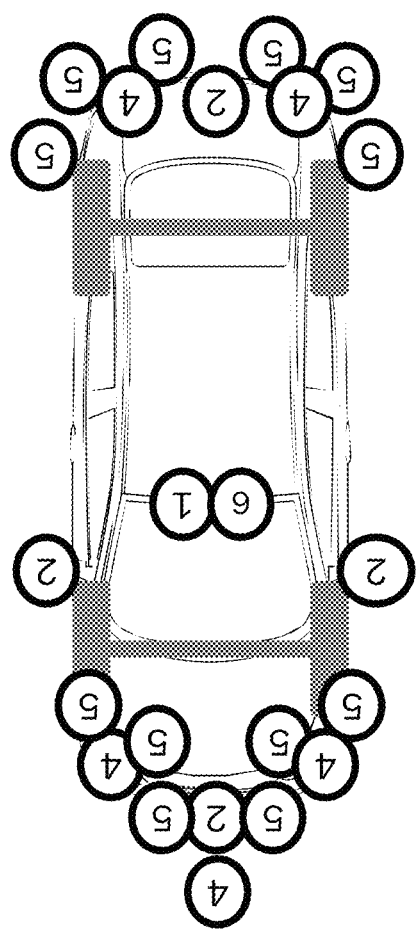
FIG. 8 is a schematic view of exemplary sensors of the driver assistance of FIG. 1.

Based on determined available free space, the system automatically aligns the vehicle with the parking space during the parking maneuver. The system may process sensor data from sensors such as but not limited to radar sensors, cameras (e.g., surround view cameras, front camera modules, etc.), and ultrasonic sensors (FIG. 8).

The system may generate different alerts pertaining to the parking maneuver. For example, an alert may include audio such as a voice (e.g., an automated voice alert) and/or video (e.g., with a text alert). The alert may include haptic elements, such as via seat mats, seats, steering wheel, etc.

The system may provide electric vehicle support. For example, the system may distinguish between a conventional parking space and an electric vehicle compatible parking space using perception algorithms that process, for example, image data from one or more cameras. Upon detecting an electric vehicle compatible parking space with a charge station (e.g., based on the location of the charger and/or charge connector location on the equipped vehicle), the system may determine a heading and/or alignment of the equipped vehicle within the electric vehicle parking space. For example, the system may laterally control the vehicle to ensure there is room for the charging station to connect to the charging port of the vehicle. For the induction-based parking slots with charge pads on the ground, the system may detect a location of charge pad(s) accurately using, for example, sensor data from one or more cameras and/or ultrasonic sensors to accurately align the equipped vehicle over the induction charge pad(s).

The system may implement a summon feature that uses a location of the remote or fob or user device of the user to plan or generate a path from the current location of the equipped vehicle to the location of the user device. For example, the vehicle may be parked in a parking space at a parking lot and the user provides a summon command using a device within the user's possession. The vehicle autonomously navigates from the current parking space to the user's location (i.e., the location of the user device). The system may inform the user about current parking status and failed/successful maneuvers (e.g., via a user device).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907;

US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular parking assistance system, the vehicular parking assistance system comprising:
   a camera disposed at a vehicle equipped with the vehicular parking assistance system and viewing exterior of the vehicle, the camera capturing image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the camera;
   wherein the vehicular parking assistance system, responsive to an input wirelessly communicated to the vehicular parking assistance system from exterior of the vehicle, determines a direction of travel for an automated parking maneuver to maneuver the vehicle toward and into a target parking space;
   wherein the vehicular parking assistance system, via processing at the ECU of image data captured by the camera, is operable to detect one or more objects viewed by the camera;
   wherein the vehicular parking assistance system, via processing at the ECU of image data captured by the camera, and responsive to detecting an object viewed by the camera, determines a boundary of a free space in the direction of travel for the automated parking maneuver, and wherein the boundary of the free space at least partially bounds an area where the vehicle can maneuver without colliding with the detected object; and
   wherein the vehicular parking assistance system, while maneuvering the vehicle in the direction of travel toward and into the target parking space, adjusts steering of the vehicle based on the determined boundary of free space in the direction of travel for the automated parking maneuver to avoid the detected object.

2. The vehicular parking assistance system of claim 1, wherein the input comprises an automated parking command, and wherein the automated parking command indicates the direction of travel.

3. The vehicular parking assistance system of claim 2, wherein the automated parking command is received from a mobile device.

4. The vehicular parking assistance system of claim 3, wherein the mobile device comprises a cell phone.

5. The vehicular parking assistance system of claim 1, further comprising a sensor, and wherein the vehicular parking assistance system determines the boundary of the free space in the direction of travel for the automated parking maneuver in part responsive to processing sensor data captured by the sensor.

6. The vehicular parking assistance system of claim 5, wherein the sensor comprises one selected from the group consisting of (i) an ultrasonic sensor, (ii) a lidar sensor, and (iii) a radar sensor.

7. The vehicular parking assistance system of claim 1, wherein the target parking space is within a garage, and wherein the automated parking maneuver comprises maneuvering the vehicle into the garage without a driver present within the vehicle.

8. The vehicular parking assistance system of claim 1, wherein the automated parking maneuver comprises maneuvering the vehicle into a parking space without a driver present within the vehicle.

9. The vehicular parking assistance system of claim 1, wherein the detected object comprises another vehicle.

10. The vehicular parking assistance system of claim 1, wherein the direction of travel comprises one selected from the group consisting of (i) a forward direction relative to the vehicle and (ii) a rearward direction relative to the vehicle.

11. The vehicular parking assistance system of claim 1, wherein the vehicular parking assistance system adjusts the path of the vehicle based on determination of presence an electric vehicle charging station or an electric vehicle charging path.

12. The vehicular parking assistance system of claim 1, wherein the vehicular parking assistance system, responsive to the input, determines a nearest available parking space for the automated parking maneuver.

13. A vehicular parking assistance system, the vehicular parking assistance system comprising:
   a camera disposed at a vehicle equipped with the vehicular parking assistance system and viewing exterior of the vehicle, the camera capturing image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the camera;
   wherein, with the vehicle aligned with an aisle of a parking area, the vehicular parking assistance system, responsive to an input wirelessly communicated to the vehicular parking assistance system from exterior of the vehicle, determines a direction of travel for an automated parking maneuver to maneuver the vehicle along the aisle of the parking area;
   wherein, as the vehicle maneuvers along the aisle of the parking area, the vehicular parking assistance system, via processing at the ECU of image data captured by the camera, detects an available parking space;
   wherein the vehicular parking assistance system, via processing at the ECU of image data captured by the camera, is operable to detect one or more objects viewed by the camera;
   wherein the vehicular parking assistance system, via processing at the ECU of image data captured by the camera, and responsive to detecting an object viewed by the camera, determines a boundary of a free space between the vehicle and the available parking space, and wherein the boundary of the free space at least partially bounds an area where the vehicle can maneuver without colliding with the detected object; and wherein the vehicular parking assistance system, while maneuvering the vehicle toward and into the available space, adjusts steering of the vehicle based on the determined boundary of free space to avoid the detected object.

14. The vehicular parking assistance system of claim 13, wherein the input is received wirelessly from a mobile device of a user of the vehicle.

15. The vehicular parking assistance system of claim 13, further comprising a sensor, and wherein the vehicular parking assistance system determines the boundary of the free space in part responsive to processing sensor data captured by the sensor.

16. The vehicular parking assistance system of claim 15, wherein the sensor comprises one selected from the group consisting of (i) an ultrasonic sensor, (ii) a lidar sensor, and (iii) a radar sensor.

17. The vehicular parking assistance system of claim 13, wherein the available parking space comprises a first available parking space along the aisle of the parking area.

18. The vehicular parking assistance system of claim 13, wherein the available parking space comprises an electric vehicle charging station.

19. A vehicular parking assistance system, the vehicular parking assistance system comprising:

a camera disposed at a vehicle equipped with the vehicular parking assistance system and viewing exterior of the vehicle, the camera capturing image data;

wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera;

wherein the vehicular parking assistance system, responsive to an input wirelessly communicated to the vehicular parking assistance system from exterior of the vehicle, determines a direction of travel for an automated parking maneuver to maneuver the vehicle toward and into a target parking space;

wherein the vehicular parking assistance system, via processing at the ECU of image data captured by the camera, is operable to detect one or more objects viewed by the camera;

a sensor comprising one selected from the group consisting of (i) an ultrasonic sensor, (ii) a lidar sensor, and (iii) a radar sensor wherein the vehicular parking assistance system, via processing at the ECU of (i) image data captured by the camera and (ii) sensor data captured by the sensor, and responsive to detecting a plurality of objects viewed by the camera, determines a boundary of a free space in the direction of travel for the automated parking maneuver, and wherein the boundary of the free space at least partially bounds an area where the vehicle can maneuver without colliding with the plurality of detected objects; and wherein the vehicular parking assistance system, while maneuvering the vehicle in the direction of travel toward and into the target parking space, adjusts steering of the vehicle based on the determined boundary of free space in the direction of travel for the automated parking maneuver to avoid each of the plurality of detected objects.

20. The vehicular parking assistance system of claim 19, wherein the input comprises an automated parking command, and wherein the automated parking command indicates the direction of travel.

21. The vehicular parking assistance system of claim 20, wherein the automated parking command is received from a mobile device.

22. The vehicular parking assistance system of claim 20, wherein the automated parking command is received from the vehicle.

* * * * *